June 17, 1969 W. B. PETERSON 3,450,013
AUXILIARY WHEEL ASSEMBLY
Filed Oct. 16, 1967

INVENTOR.
WILLIAM B. PETERSON
BY Fulwider, Patton, Rieber,
Lee and Utecht
ATTORNEYS June 17, 1969  W. B. PETERSON  3,450,013
AUXILIARY WHEEL ASSEMBLY
Filed Oct. 16, 1967  Sheet 2 of 2

INVENTOR.
WILLIAM B. PETERSON
BY Fulwider, Patton, Rieber,
Lee and Utecht
ATTORNEYS

United States Patent Office 3,450,013
Patented June 17, 1969

3,450,013
AUXILIARY WHEEL ASSEMBLY
William B. Peterson, 1952 Galerita Drive,
San Pedro, Calif. 90732
Filed Oct. 16, 1967, Ser. No. 675,582
Int. Cl. E01c *19/25;* B60b *15/08*
U.S. Cl. 94—50
4 Claims

ABSTRACT OF THE DISCLOSURE

An auxiliary wheel assembly usable with the pneumatic tires of a vehicle such as a tractor or the like in compacting, spreading and dozing of rubbish, trash, refuse or garbage materials. The wheel assembly includes a steel drum which is fitted over the conventional pneumatic tire of the vehicle. The outer surface of the steel drum is provided with outwardly projecting cleats. To protect the tire against damage, an inboard and outboard shield are utilized to cover the opposite edges of the drum. Inboard and outboard retainer means are affixed to the edges of the drum and inboard and outboard spacer rings are slidably disposed between the opposite sides of the tire and the retainer means. The drum and shields are first arranged around a deflated or partially inflated pneumatic tire. The latter is then inflated to its operating pressure so as to urge the spacer rings apart into tight engagement with the shields to thereby securely maintain the parts of the wheel assembly in position upon the tire.

BACKGROUND OF THE INVENTION

Field of invention

The present invention relates generally to the field of material handling and more particularly to an auxiliary wheel assembly that is positioned over the pneumatic tire of a vehicle in order that said vehicle may be utilized to perform various jobs such as refuse compaction, crushing, dozing or the like.

Description of prior art

There exist steel drum assemblies which are mounted in encircling relationship with the pneumatic tires of a vehicle. Examples of such devices are shown in U.S. Patent No. 1,935,950 issued Nov. 21, 1933 to J. E. Lawrence and U.S. Patent No. 2,235,953 issued Mar. 25, 1941 to W. B. Whitfield. These examples of prior art, however, do not employ removable shields for preventing damage to the pneumatic tire from sharp objects during the compaction operation.

SUMMARY OF INVENTION

It is a major object of the present invention to provide an auxiliary wheel assembly having a rigid drum received over a pneumatic tire, shields removably carried by the drum for protecting the tire against damage and unique mounting means carried by the drum for maintaining the wheel assembly positively but removably mounted upon the pneumatic tire.

Another object of the present invention is to provide an auxiliary assembly of the aforedescribed nature which is extremely rugged, simple of design and capable of affording a long and useful service life.

Yet another object of the present invention is to provide an auxiliary wheel assembly of the aforedescribed nature which is economical of manufacture.

A more particular object of the present invention is to provide an auxiliary wheel assembly of the aforedescribed nature wherein the drum is provided with inboard and outboard sides of the shields and with inboard and outboard spacer rings axially slidably interposed between the opposite sides of the pneumatic tire and the aforementioned shields, with such spacer rings being urged towards their respective shields when the tire in inflated to its operating pressure to thereby maintain the parts of the auxiliary wheel assembly securely in place.

Other objects and advantages of the present invention will become apparent when taken in consideration with the following detailed description and the accompanying drawings.

Description of preferred embodiment

Figure 1:
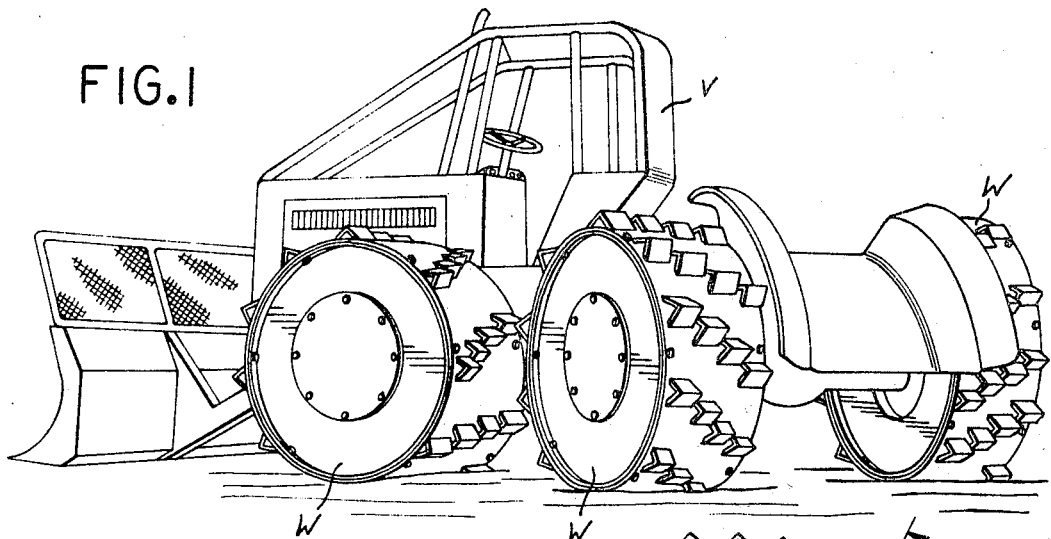
FIG. 1 is a perspective view showing a plurality of auxiliary wheel assemblies embodying the present invention mounted upon the pneumatic tires of a vehicle.
Figure 2:
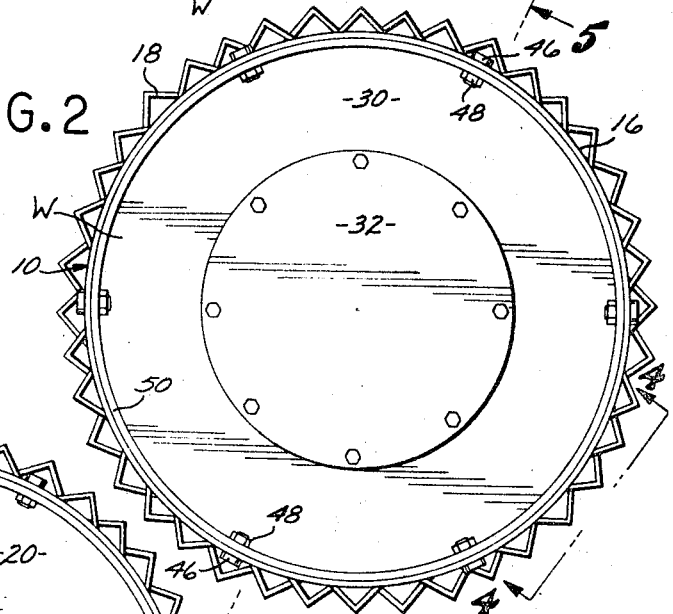
FIG. 2 is a side elevational view in enlarged scale showing the outboard side of one of said auxiliary wheel assemblies.

Referring to the drawings and particularly FIG. 1 thereof, there is shown a vehicle V such as a conventional self-powered tractor having four pneumatic tires each of which are provided with one of the auxiliary wheel assemblies W embodying the present invention. It should be understood that each of the wheel assemblies W is of like construction. The tractor V is adapted to be employed for various material-handling tasks such as the dozing, compaction, crushing or demolishing of rubbish or the like.

With reference to the remaining figures of the drawings, each auxiliary wheel assembly W includes a rigid open-ended drum, generally designated 10, which may be formed of steel. The inner diameter of the drum 10 is slightly smaller than the outer diameter of the pneumatic tire T of the vehicle V whereby the inner drum surface 14 may be moved axially over the tire for snug engagement therewith, as indicated particularly in FIG. 5. The outer surface 16 of drum 10 is provided with a plurality of pointed cleats or lugs 18. The cleats 18 may be formed of steel and welded onto the outer drum surface 16 in such a pattern as to provide the desired traction, compaction, crushing or demolition action.

Figure 3:
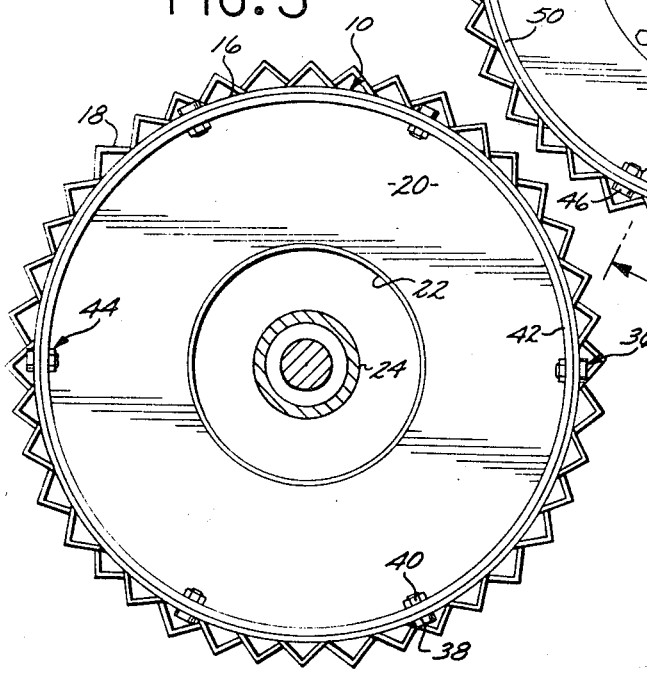
FIG. 3 is a side elevational view showing the inboard side of one of said auxiliary wheel assemblies.
Figures 5, 6:
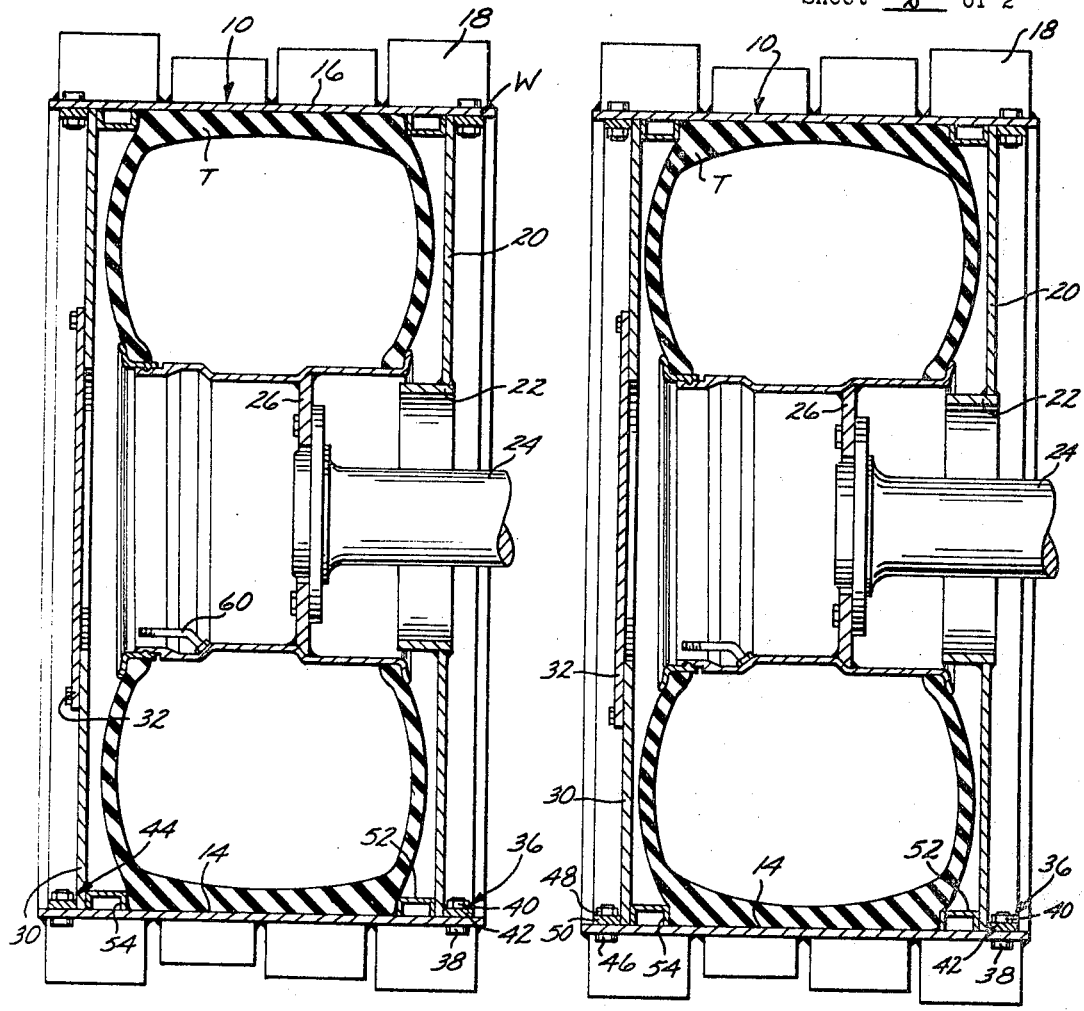
FIG. 5 is a sectional view taken in enlarged scale on line 5—5 of FIG. 2 and showing one of said auxiliary wheel assemblies before its pneumatic tire has been inflated to its operating pressure.
FIG. 6 is a view similar to FIG. 5, but showing the appearance of said wheel assembly after said tire has been inflated.
Figure 4:
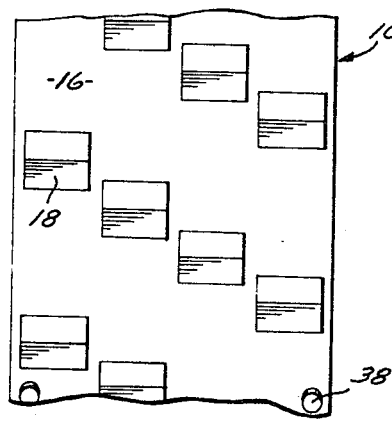
FIG. 4 is a broken view taken in enlarged scale along the line 4—4 of FIG. 2.

As indicate in FIGS. 3 and 5, the inboard edge of the drum 10 is provided with a rigid shield 20 of steel construction. The shield 20 is formed with a central aperture 22 for reception of axle 24 of the vehicle V. The axle 24 is suitably connected to the flanged wheel 26 of the vehicle V in a conventional manner. The outboard end of the drum 10 is provided with an outboard shield 30 which may also be of steel construction. The outboard shield 30 is of solid configuration except for a coaxial removable access panel 32, such panel being bolted to the shield 30. Both the inboard shield 20 and the outboard shield 30 are axially slidable relative to the inner wall 14 of the drum 10.

With continued reference to FIGS. 3 and 5, the inboard portion of the drum 10 is provided with retainer means, generally designated 36. The retainer means 36 include a plurality of bolts 38 which are spaced generally uniformly in a circumferential pattern about the periphery of the drum. The head of each bolt 38 is disposed on the outer surface 16 of the drum 10 and the shank thereof extends radially inwardly through the drum wall to receive a nut 40. The shanks of bolts 38 extend through a retainer ring 42. Retainer ring 42 snugly telescopically interfits drum 10.

The outboard portion of the drum 10 is provided with retainer means, generally designated 44, similar to the inboard retaining means 36. Thus, the outboard retaining means include a plurality of bolts 46 that extend through the wall of the drum to receive nuts 48. The shanks of the bolts 46 extend through a retainer ring 50.

Interposed between the inboard side of the tire T and the retainer ring 42 is an inboard spacer ring 52. The spacer ring 52 may be generally U-shaped in transverse cross-section and the outer diameter is slightly smaller than the inner diameter of the drum D whereby the spacer ring is axially slidable along the inner drum surface 14. An outboard spacer ring 54 of like construction is interposed between the outboard side of the tire T and the outboard shield 30. The outboard retainer ring 54 is also axially slidable with respect to the inner drum surface 14.

In positioning the aforedescribed wheel assembly W upon the tire T, the inboard shield 20, inboard retaining means 36 and inboard spacer ring 52 may be positioned as indicated in FIG. 5 generally. The drum 10 is then urged axially over the tire T to a generally centered position with respect to such tire. At this time the tire T will not be fully inflated. Thereafter, the outboard retaining ring 54, outboard shield 30 and outboard retaining means 44 will be positioned as indicated in FIG. 5. Finally, the tire T is inflated to its operating pressure. Access to the valve stem 60 of tire T and the mounting hub may be had through access door 32. During such inflation the tire will force the inboard and outboard spacer rings 52 and 54 away from the center of the drum 10 and into tight engagement with the inboard and outboard shields 20 and 30, respectively, with the shields in turn being firmly held against the inboard and outboard retainer rings 42 and 50. Thereafter, the tire T and the component parts of the wheel assembly A will be held securely in position even during rough usage.

Various modifications and changes may be made with respect to the foregoing detailed description without depart from the spirit of the present invention or the scope of the following claims.

I claim:

1. An auxiliary wheel assembly for use with a vehicle-mounted pneumatic tire, comprising:
   a rigid open-ended drum having an inner diameter slightly smaller than the outer dameter of said tire whereby the inner surface of said drum may be moved axially over said tire for snug engagement therewith;
   an inboard shield slidably disposed near the inboard edge of said drum;
   an outboard shield slidably disposed near the outboard edge of said drum;
   inboard retainer means secured to the inboard portion of said drum inboard of said inboard shield to restrain it against axial movement toward said inboard edge;
   outboard retainer means secured to the outboard portion of said drum outboard of said outboard shield to restrain it against axial movement towards said outboard edge;
   an inboard spacer ring axially slidably interposed between the inboard side of said tire and said inboard shield;
   and an outboard spacer ring axially slidably interposed between the outboard side of said tire and said outboard shield, with said spacer rings being urged into tight engagement with said shields by said tire when said tire is inflated to its operating pressure.

2. An auxiliary wheel assembly as set forth in claim 1 wherein said retainer means include removable fastening means secured to said drum and a retaining ring snugly telescopically disposed within said drum, said fastening means removably securing said retaining ring to said drum.

3. A compaction wheel assembly as set forth in claim 1 wherein said outboard shield is provided with a removable tire valve access panel.

4. A compaction wheel assembly as set forth in claim 1 wherein said fastening means consist of a plurality of bolts extending through said drum and nuts received by said bolts.

References Cited
UNITED STATES PATENTS

| | | | |
|---|---|---|---|
| 916,668 | 3/1909 | Carithers | 301—39 |
| 1,935,950 | 11/1933 | Lawrence | 94—50 |
| 2,315,397 | 3/1943 | Butler | 94—50 |
| 2,316,502 | 4/1943 | Carman | 301—40 XR |
| 2,985,079 | 5/1961 | Clapper | 94—50 |

JACOB L. NACKENOFF, *Primary Examiner.*

U.S. Cl. X.R.

301—39